(12) United States Patent
Sugaiwa et al.

(10) Patent No.: US 10,754,335 B2
(45) Date of Patent: Aug. 25, 2020

(54) AUTOMATED DRIVING SYSTEM

(71) Applicant: TOYOTA JIDOSHA KABUSHIKI KAISHA, Toyota-shi, Aichi-ken (JP)

(72) Inventors: Taisuke Sugaiwa, Susono (JP); Kentaro Ichikawa, Shizuoka-ken (JP); Hiromitsu Urano, Namazu (JP); Kunihito Sato, Mishima (JP); Maiko Hirano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 114 days.

(21) Appl. No.: 15/915,518

(22) Filed: Mar. 8, 2018

(65) Prior Publication Data

US 2018/0267530 A1 Sep. 20, 2018

(30) Foreign Application Priority Data

Mar. 14, 2017 (JP) .................. 2017-048848

(51) Int. Cl.
| | |
|---|---|
| *G05D 1/00* | (2006.01) |
| *G05D 1/02* | (2020.01) |
| *G08G 1/16* | (2006.01) |
| *B60W 30/00* | (2006.01) |

(52) U.S. Cl.
CPC .......... *G05D 1/0055* (2013.01); *B60W 30/00* (2013.01); *G05D 1/0088* (2013.01); *G05D 1/0214* (2013.01); *G05D 1/0238* (2013.01); *G05D 1/0257* (2013.01); *G05D 1/0274* (2013.01);
(Continued)

(58) Field of Classification Search
CPC .. G05D 1/0055; G05D 1/0088; G05D 1/0214; G05D 1/0238; G05D 1/0257; G05D 1/0274; G05D 2201/0213; B60W 10/18; B60W 10/20; B60W 10/22; G01S 13/04;
(Continued)

(56) References Cited

U.S. PATENT DOCUMENTS 9,511,799 B2 * 12/2016 Lavoie ............... B62D 15/0275
10,101,743 B2 * 10/2018 Abe ..................... G05D 1/0061
(Continued)

FOREIGN PATENT DOCUMENTS

EP 3133455 A1 2/2017
EP 3251911 A1 12/2017
(Continued)

OTHER PUBLICATIONS

Kyoichi, Abe, Machine translation of JP2010250772, Vehicle Controller and Vehicle Control Method (Year: 2010).*

*Primary Examiner* — Anne Marie Antonucci
*Assistant Examiner* — Sahar Motazedi
(74) *Attorney, Agent, or Firm* — Sughrue Mion, PLLC

(57) ABSTRACT

An automated driving system includes at least one electronic control unit configured to: recognize at least one obstacles around a vehicle, based on ambient surroundings of the vehicle; create a traveling plan of the vehicle, based on the ambient surroundings and a result of recognition of the at least one obstacles; control the vehicle using an actuator installed on the vehicle, based on the traveling plan; and perform, according to input from a user of the vehicle, overwriting operation to change the result of recognition of the at least one obstacles used for creation of the traveling plan.

8 Claims, 7 Drawing Sheets

(52) U.S. Cl.
CPC ............. *G08G 1/165* (2013.01); *G08G 1/166* (2013.01); *G05D 2201/0213* (2013.01)

(58) Field of Classification Search
CPC ........ G01S 13/86; G01S 13/87; G01S 13/931; G01S 17/89
See application file for complete search history.

(56) References Cited

U.S. PATENT DOCUMENTS

| | | | | |
|---|---|---|---|---|
| 2010/0228427 | A1* | 9/2010 | Anderson | B60W 30/09 701/31.4 |
| 2012/0059789 | A1* | 3/2012 | Sakai | G08G 1/161 706/52 |
| 2015/0291216 | A1* | 10/2015 | Sato | B60W 50/14 701/23 |
| 2016/0259334 | A1* | 9/2016 | Hashimoto | B60W 50/082 |
| 2016/0375901 | A1* | 12/2016 | Di Cairano | B60W 30/09 701/26 |
| 2017/0113686 | A1* | 4/2017 | Horita | B60W 30/12 |
| 2017/0253241 | A1* | 9/2017 | Filev | B60W 50/0097 |
| 2018/0050692 | A1* | 2/2018 | Kim | B60W 50/0098 |
| 2018/0105165 | A1* | 4/2018 | Alarcon | H04L 67/12 |
| 2018/0170326 | A1* | 6/2018 | Wang | B60T 7/085 |
| 2018/0261095 | A1* | 9/2018 | Qiu | G08G 1/164 |
| 2018/0273031 | A1* | 9/2018 | Fujita | G01C 21/3667 |
| 2018/0308364 | A1* | 10/2018 | Kume | B60R 21/00 |
| 2018/0326995 | A1* | 11/2018 | Hiramatsu | B60W 50/10 |
| 2019/0071075 | A1* | 3/2019 | Mimura | B60R 21/00 |
| 2019/0106118 | A1* | 4/2019 | Asakura | G08G 1/00 |

FOREIGN PATENT DOCUMENTS

| | | |
|---|---|---|
| JP | 2016-031660 A | 3/2016 |
| JP | 2016-137819 A | 8/2016 |
| JP | 2016-170523 A | 9/2016 |
| JP | 2017-41233 A | 2/2017 |

* cited by examiner

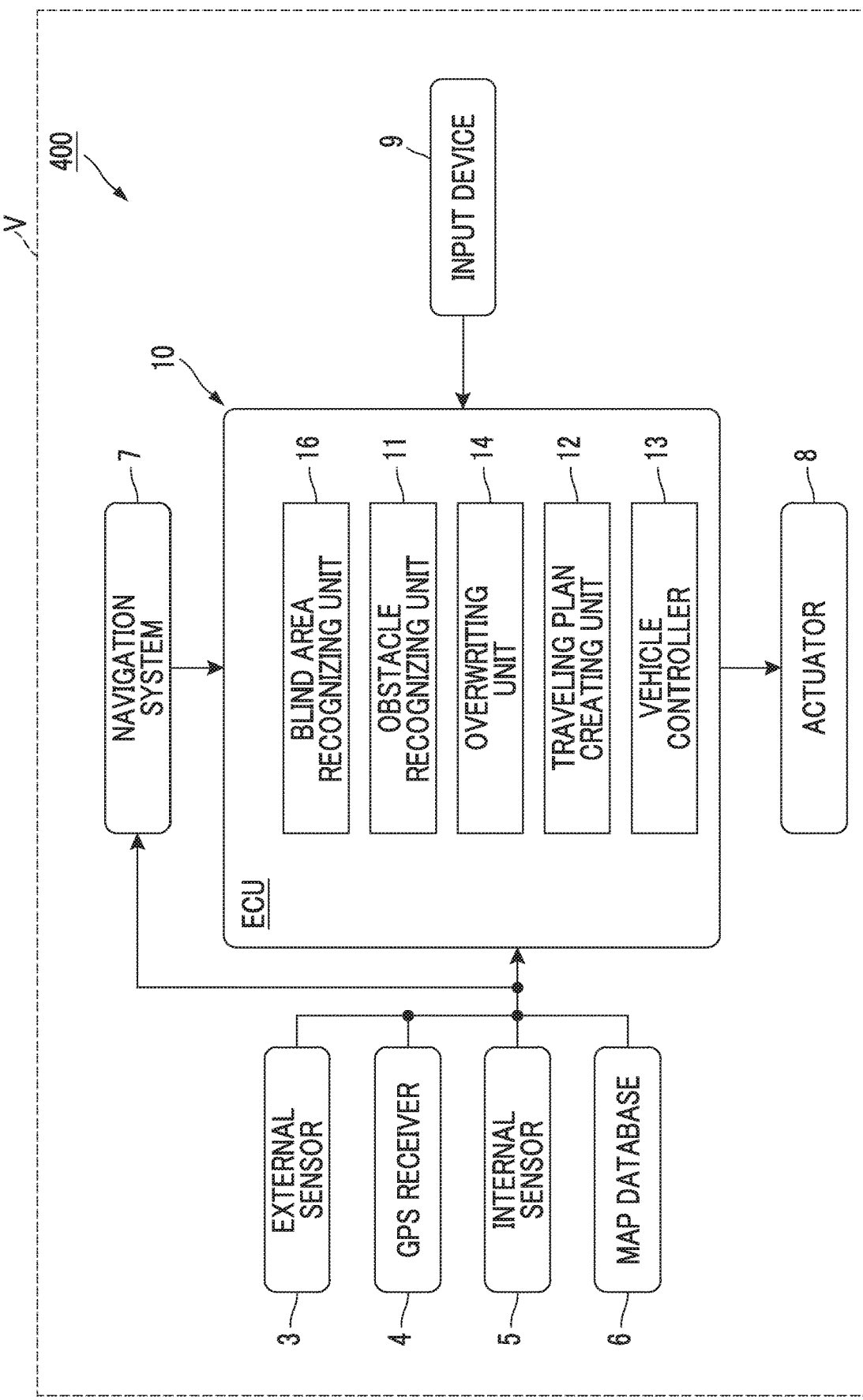

AUTOMATED DRIVING SYSTEM

INCORPORATION BY REFERENCE

The disclosure of Japanese Patent Application No. 2017-048848 filed on Mar. 14, 2017 including the specification, drawings and abstract is incorporated herein by reference in its entirety.

BACKGROUND

1. Technical Field

The disclosure relates to an automated driving system.

2. Description of Related Art

As one example of automated driving system, an automated driving control system described in Japanese Patent Application Publication No. 2016-137819 (JP 2016-137819 A), for example, is known. The automated driving system recognizes an obstacle or obstacles around a vehicle, and performs automated driving of the vehicle, based on the result of recognition of the obstacle(s) and ambient surroundings of the vehicle.

SUMMARY

According to the above technology, it is technically difficult to achieve complete recognition of obstacles on the system side. Therefore, during operation of the vehicle in an automated driving mode, the automated driving may be interrupted and switched to manual driving, each time it becomes difficult for the system to correctly recognize an obstacle. The switching of the driving mode to the manual driving is cumbersome for the driver, and the convenience of the automated driving may deteriorate.

This disclosure provides an automated driving system that can curb deterioration of the convenience of automated driving.

A first aspect of the disclosure provides an automated driving system. The automated driving system according to the first aspect of the disclosure includes at least one electronic control unit configured to: recognize at least one obstacle around a vehicle, based on ambient surroundings of the vehicle; create a traveling plan of the vehicle, based on the ambient surroundings and a result of recognition of the at least one obstacle; control the vehicle using an actuator installed on the vehicle, based on the traveling plan; and perform, according to input from a user of the vehicle, overwriting operation to change the result of recognition of the at least one obstacle used for creation of the traveling plan.

Regarding an obstacle that is present around the vehicle during operation in an automated driving mode, the user can recognize a situation where the obstacle has no influence on automated driving, whereas it may be difficult for the obstacle recognizing unit to correctly recognize the situation. In this situation, the automated driving system configured as described above is able to continue automated driving (avoid switching to manual driving), by excluding the obstacle from the obstacle recognition result through the input of the user. Namely, it is possible to curb deterioration of the convenience of automated driving.

In the first aspect, the at least one electronic control unit may be configured to perform operation to exclude at least a part of the at least one obstacle from the result of recognition of the at least one obstacle, as the overwriting operation.

In the first aspect, automated driving system may further include a display device configured to present the result of recognition of the at least one obstacle, to the user.

With the above configuration, the user can check the obstacle recognition result.

In the first aspect, the at least one electronic control unit may be configured to perform the overwriting operation, only during a period in which the input from the user is continued.

With the above configuration, the user can designate a period in which the overwriting operation is carried out.

In the first aspect, the at least one electronic control unit may be configured to calculate a reliability of the result of recognition of the at least one obstacle; and perform the overwriting operation according to the input from the user, when the calculated reliability is smaller than a predetermined threshold value.

With the above configuration, when the reliability of the obstacle recognition result obtained by the obstacle recognizing unit is equal to or higher than the threshold value, the traveling plan can be created by surely taking account of the obstacle recognition result.

In the first aspect, the at least one electronic control unit may be configured to create a next traveling plan, while the vehicle is controlled based on the traveling plan and perform the overwriting operation on the result of recognition of the at least one obstacle used for creation of the next traveling plan while the vehicle is controlled based on the traveling plan.

In the first aspect, the display device may be configured to function as an input unit receiving the input from the user; and the at least one electronic control unit may be configured to perform the overwriting operation, according to the input from the user to the input unit.

In the first aspect, the at least one electronic control unit may be configured to switch between automated driving in which the vehicle is controlled based on the traveling plan, and manual driving in which the vehicle is controlled based on operation of the user.

A second aspect of the disclosure provides an automated driving system. The automated driving system according to the second aspect of the disclosure includes at least one electronic control unit configured to: recognize ambient surroundings of a vehicle and at least one obstacle around the vehicle; create a traveling plan of the vehicle, based on a result of recognition of the ambient surroundings and a result of recognition of the at least one obstacle; control the vehicle using an actuator installed on the vehicle, based on the traveling plan; and perform, according to input from a user of the vehicle, overwriting operation to change at least one of the result of recognition of the at least one obstacle, and the result of recognition of the ambient surroundings.

In the second aspect, the at least one electronic control unit may be configured to perform operation to exclude at least a part of at least one obstacle from the result of recognition of the at least one obstacle, as the overwriting operation.

In the second aspect, the at least one electronic control unit may be configured to recognize a blind area included in the ambient surroundings, around the vehicle the blind area being an area in which it is difficult to recognize the at least one obstacle; and exclude at least a part of the blind area from the result of recognition of the ambient surroundings, according to the input from the user, as the overwriting operation.

In the second aspect, the at least one electronic control unit may be configured to switch between automated driving in which the vehicle is controlled based on the traveling plan, and manual driving in which the vehicle is controlled based on operation of the user.

According to the disclosure, it is possible to provide the automated driving system that can curb deterioration of the convenience of automated driving.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a block diagram showing the configuration of an automated driving system of a fourth embodiment.

DETAILED DESCRIPTION OF EMBODIMENTS

Figure 1:
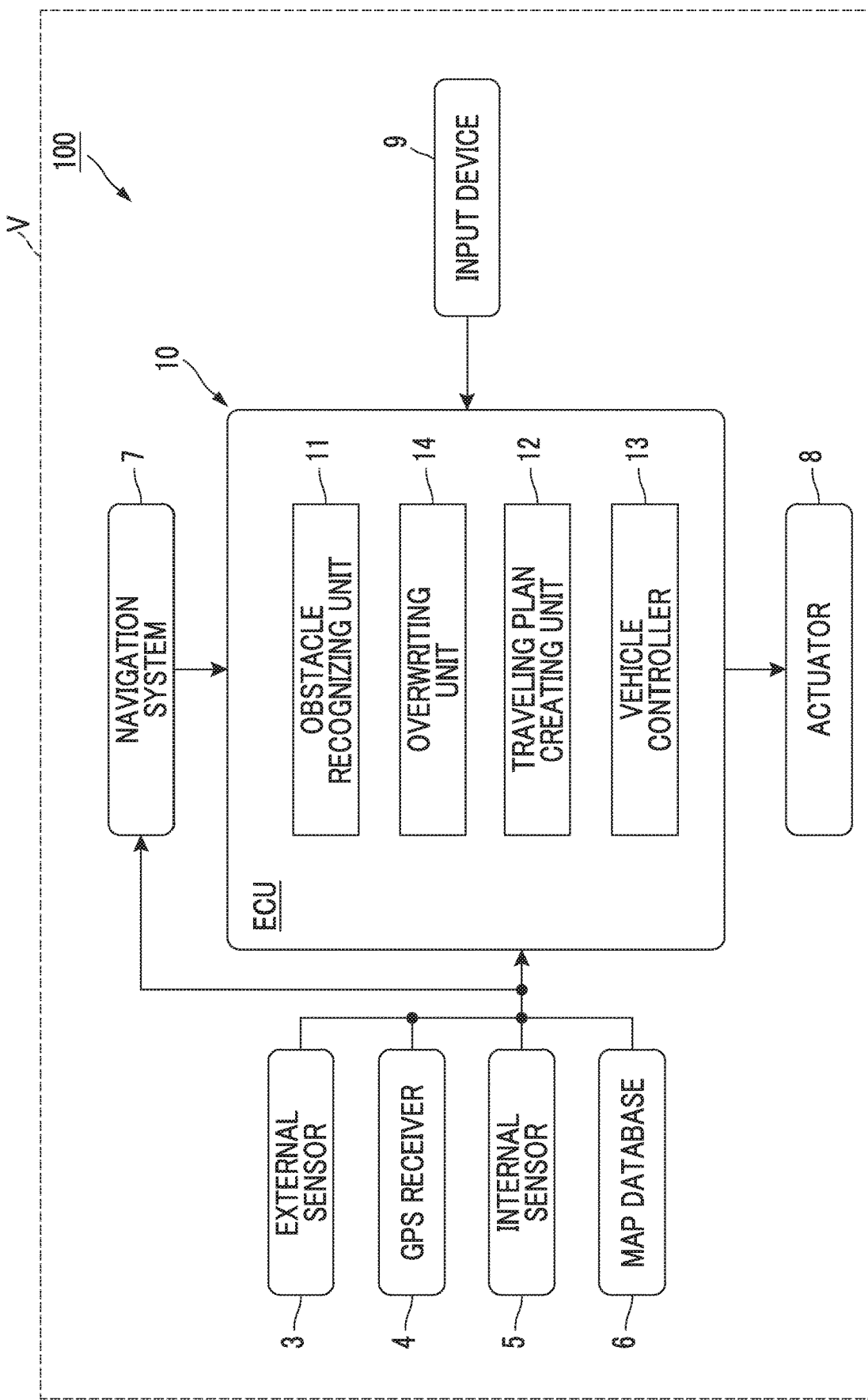
FIG. 1 is a block diagram showing the configuration of an automated driving system of a first embodiment.

Some embodiments of the disclosure will be described with reference to the drawings. In the following description, the same reference numerals are assigned to the same or corresponding elements, of which repeated description will not be provided.

First Embodiment

FIG. 1 is a block diagram showing the configuration of an automated driving system 100 of a first embodiment. As shown in FIG. 1, the automated driving system 100 is installed on a vehicle V, such as a passenger automobile. The automated driving system 100 is a system for causing the vehicle V to travel in an automated driving mode. The automated driving means vehicle control for causing the vehicle V to autonomously travel toward a preset destination, without requiring a user (including a driver, etc.) of the vehicle V to perform driving operation.

The automated driving system 100 includes an external sensor or sensors 3, GPS (Global Positioning System) receiver 4, internal sensor or sensors 5, map database 6, navigation system 7, actuators 8, input device 9, and an ECU (Electronic Control Unit) 10.

The external sensor 3 is a detection device that detects ambient surroundings (external conditions) as circumstances surrounding the vehicle V. The external sensor 3 includes at least one of a camera and a radar sensor. The camera is an image pickup device that captures an image of the ambient surroundings. The camera is provided on the rear side of the front windshield of the vehicle V. The camera transmits captured image information to the ECU 10. The camera may be a monocular camera, or a stereo camera. The stereo camera has two image pickup units arranged so as to reproduce a binocular disparity. The captured image information of the stereo camera includes information in the depth direction. The radar sensor is a detection device that detects an object around the vehicle V, using radio waves (such as millimeter waves) or light. The radar sensor may be, for example, a millimeter-wave radar or a LIDAR (Laser Imaging Detection and Ranging) The radar sensor transmits radio waves or light to the surroundings of the vehicle V, and detects an object by receiving the radio waves or light reflected by the object. The radar sensor transmits object information to the ECU 10.

The GPS receiver 4 receives signals from three or more GPS satellites, and obtains position information indicating the position of the vehicle V. The position information includes the latitude and the longitude, for example. The GPS receiver 4 transmits the information on the measured position of the vehicle V to the ECU 10. The GPS receiver 4 may be replaced with another means that can specify the latitude and longitude at which the vehicle V is present.

The internal sensors 5 are detection devices that detect traveling conditions of the vehicle V (i.e., how the vehicle V is operated). The internal sensors 5 include at least a vehicle speed sensor. The vehicle speed sensor is a detection device that detects the speed of the vehicle V. As the vehicle speed sensor, a wheel speed sensor that is provided on a wheel of the vehicle V or a driveshaft, or the like, that rotates as a unit with the wheel, for detecting the rotational speed of the wheel, is used. The vehicle speed sensor transmits the detected vehicle speed information to the ECU 10. The internal sensors 5 may include an acceleration sensor or a yaw rate sensor. The acceleration sensor is a detection device that detects the acceleration of the vehicle V. The acceleration sensor includes a longitudinal acceleration sensor that detects the acceleration of the vehicle V in the longitudinal direction, and a lateral acceleration sensor that detects the lateral acceleration of the vehicle V. The acceleration sensor transmits the information on the acceleration of the vehicle V to the ECU 10. The yaw rate sensor is a detection device that detects the yaw rate (rotation angular velocity) of the vehicle V about the vertical axis passing the center of gravity of the vehicle V. As the yaw rate sensor, a gyro sensor, for example, may be used. The yaw rate sensor transmits the information on the detected yaw rate of the vehicle V to the ECU 10.

The map database 6 is a database that stores map information. The map database 6 is formed in an HDD (Hard Disk Drive) installed on the vehicle V. The map information includes position information of roads, lane information, road type information, road shape information, position information of intersections and branching points, position information of buildings, and so forth. The road type information is used for discriminating the types of roads, such as a limited highway (or expressway), and a general road. The road shape information includes type information, such as a curved section, and a straight section, and the curvature of the road, for example. The map database 6 may be stored in a computer of a facility, such as an information processing center, which can communicate with the vehicle V.

The navigation system 7 is a system that guides the user of the vehicle V to a preset destination. The navigation system 7 recognizes a traveling road and a traveling lane on which the vehicle V is traveling, based on the position of the vehicle V measured in the GPS receiver 4, and the map information of the map database 6. The navigation system 7 computes a target route from the position of the vehicle V to the destination. The navigation system 7 guides the user along the target route, using a display panel and a speaker. The navigation system 7 transmits the position information of the vehicle V, information on the traveling lane of the vehicle V, and information on the target route of the vehicle V, to the ECU 10.

The actuators 8 are devices that perform traveling control of the vehicle V. The actuators 8 include at least an engine actuator, a brake actuator, and a steering actuator. The engine actuator changes the amount of air supplied to the engine (e.g., changes the throttle opening) according to a control signal from the ECU 10, thereby to control the driving force of the vehicle V. In the case where the vehicle V is a hybrid vehicle or an electric vehicle, the engine actuator controls driving force of a motor as a power source. The brake actuator controls a brake system according to a control signal from the ECU 10, so as to control braking force applied to the wheels of the vehicle V. As the brake system, a hydraulic brake system may be used, for example. In the case where the vehicle V is equipped with a regenerative brake system, the brake actuator may control both the hydraulic brake system and the regenerative brake system. The steering actuator controls driving of an assist motor that controls steering torque in an electric power steering system, according to a control signal from the ECU 10. In this manner, the steering actuator controls steering torque of the vehicle V.

The input device 9 is an interface that allows the user of the vehicle V to enter various kinds of information into the automated driving system 100. The input device 9 is an HMI (Human Machine Interface). The input device 9 transmits information entered by the user to the ECU 10. In the case where a certain obstacle around the vehicle V has no influence on automated driving of the vehicle V, the user performs overwriting input on the input device 9 so as to cause the system to ignore the obstacle recognized on the system side. In this embodiment, the input device 9 is a push-button switch, and transmits an ON signal to the ECU 10, during a period in which the button is kept pushed down (i.e., during overwriting input from the user).

The ECU 10 controls the vehicle V. The ECU 10 is an electronic control unit having CPU (Central Processing Unit), ROM (Read Only Memory), RAM (Random Access Memory), CAN (Controller Area Network) communication circuit, and so forth. The ECU 10 is connected to a network with which it communicates using the CAN communication circuit, for example, and is connected to the constituent elements of the vehicle V as described above such that it can communicate with the elements. The ECU 10 sends and receives data by operating the CAN communication circuit, based on a signal generated by the CPU, for example, stores the input data in the RAM, loads the RAM with a program stored in the ROM, and executes the program loaded into the RAM, thereby to implement a function of a constituent element of the ECU 10. The ECU 10 may consist of two or more electronic control units. The ECU 10 includes an obstacle recognizing unit 11, a traveling plan creating unit 12, a vehicle controller 13, and an overwriting unit 14.

The obstacle recognizing unit 11 recognizes one obstacle or two or more obstacles around the vehicle V, based on the result of detection of the external sensor(s) 3 (ambient surroundings of the vehicle V). The obstacles include stationary obstacles, such as a guardrail, roadside tree, and a building, and moving obstacles, such as a person (pedestrian), animal, bicycle, and another vehicle. The obstacle recognizing unit 11 recognizes at least one of the position, size, range, and moving direction of the one obstacle or each of the obstacles, and the velocity of the obstacle relative to the vehicle V. The obstacle recognizing unit 11 outputs the result of recognition of the obstacle(s) to the traveling plan creating unit 12 via the overwriting unit 14.

The traveling plan creating unit 12 creates a traveling plan of the vehicle V, based on at least one of the detection results of the external sensor(s) 3 and the internal sensor(s) 5, position information obtained by the GPS receiver 4, map information of the map database 6, various kinds of information transmitted from the navigation system 7, and the obstacle recognition result generated from the obstacle recognizing unit 11 via the overwriting unit 14. The traveling plan creating unit 12 starts creating a traveling plan when the user performs operation to start automated driving control. The traveling plan includes a long-term traveling plan for a period it takes for the vehicle V to reach a preset designation, from the current position of the vehicle V, and a short-term traveling plan corresponding to an actual road environment and ambient surroundings. The long-term traveling plan depends on map information. The short-term traveling plan is a plan with which the vehicle V is expected to travel over a detection range of the external sensor(s) 3 (e.g., a range within 150 m ahead of the vehicle V). The short-term traveling plan may be created repeatedly, from a time point at which the request for start of automated driving is entered to a time point at which the vehicle V reaches the preset destination (while the automated driving is performed).

The traveling plan creating unit 12 creates the long-term traveling plan of the vehicle V, based on the target route set by the navigation system 7 and the map information of the map database 6. The long-term traveling plan has a control target value of the vehicle V corresponding to a position on the target route of the vehicle V. The position on the target route is a position in a direction in which the target route extends on the map. The position on the target route means a set vertical position set for each given interval (e.g., 1 m) in the direction of extension of the target route. The control target value provides a control target of the vehicle V in the long-term traveling plan. The control target value is set in association with each of the set vertical positions on the target route. The traveling plan creating unit 12 sets the set vertical positions at the given intervals on the target route, and also sets a control target value for each of the set vertical positions, to thus create the long-term traveling plan. The set vertical position and a target lateral position may be combined and set as one position coordinate. The set vertical position and target lateral position mean information of a vertical position and information of a lateral position set as targets in the long-term traveling plan.

The traveling plan creating unit 12 creates a short-term traveling plan, based on the detection results of the external sensor(s) 3 and the internal sensor(s) 5, obstacle recognition result generated from the obstacle recognizing unit 11 via the overwriting unit 14, position of the vehicle V, and the long-term traveling plan. The position of the vehicle V is recognized based on the position information of the vehicle V received by the GPS receiver 4, and the map information of the map database 6. The vehicle position used in the navigation system 7 may be obtained from the navigation system 7 and recognized as the position of the vehicle V. When the vehicle position of the vehicle V is measured by a sensor installed on the road side, the position of the vehicle V may be obtained from the sensor via communications, and recognized as the position of the vehicle V.

Like the long-term traveling plan, the short-term traveling plan has short-term control target values corresponding to a set vertical position on a target route. The short-term control target values provide control targets of the vehicle V in the short-term traveling plan. The short-term control target values are set in association with each set vertical position on the target route. The short-term control target values include a short-term target lateral position of the vehicle V, and a short-term target vehicle speed of the vehicle V. The short-term target lateral position is the lateral position of the vehicle V that provides a control target in the short-term traveling plan. The short-term target vehicle speed is the vehicle speed of the vehicle V that provides a control target in the short-term traveling plan.

The vehicle controller 13 transmits control signals to the actuators 8, based on the traveling plan created by the traveling plan creating unit 12. In this manner, the vehicle V is controlled, so that the vehicle V autonomously travels according to the traveling plan.

The overwriting unit 14 performs overwriting operation to exclude one obstacle or at least a part of two or more obstacles from the obstacle recognition result based on which the traveling plan is created by the traveling plan creating unit 12. More specifically, when an ON signal is transmitted from the input device 9, in response to input into the input device 9 by the user, the overwriting unit 14 determines that no obstacle was recognized by the obstacle recognizing unit 11, and executes overwriting operation to output 0 (a result indicating that no obstacle is recognized) from the obstacle recognizing unit 11 to the traveling plan creating unit 12.

In this embodiment, the overwriting unit 14 performs the overwriting operation, only during a period in which input from the user is continued in the input device 9, and the ON signal is kept transmitted from the input device 9. On the other hand, when there is no input by the user into the input device 9, and no ON signal is transmitted from the input device 9, the obstacle recognition result obtained by the obstacle recognizing unit 11 is generated as it is to the traveling plan creating unit 12. As the overwriting operation, the overwriting unit 14 of this embodiment is able to perform the whole overwriting operation as operation to exclude (ignore) all obstacles recognized by the obstacle recognizing unit 11 from the obstacle recognition result. When the overwriting unit 14 carried out the overwriting operation, it stores a log (record) indicating execution of the overwriting operation and the content of the overwriting operation, in the ROM, or the like, of the ECU 10.

Next, one example of a control routine executed by the automated driving system 100 will be described.

Figure 2:
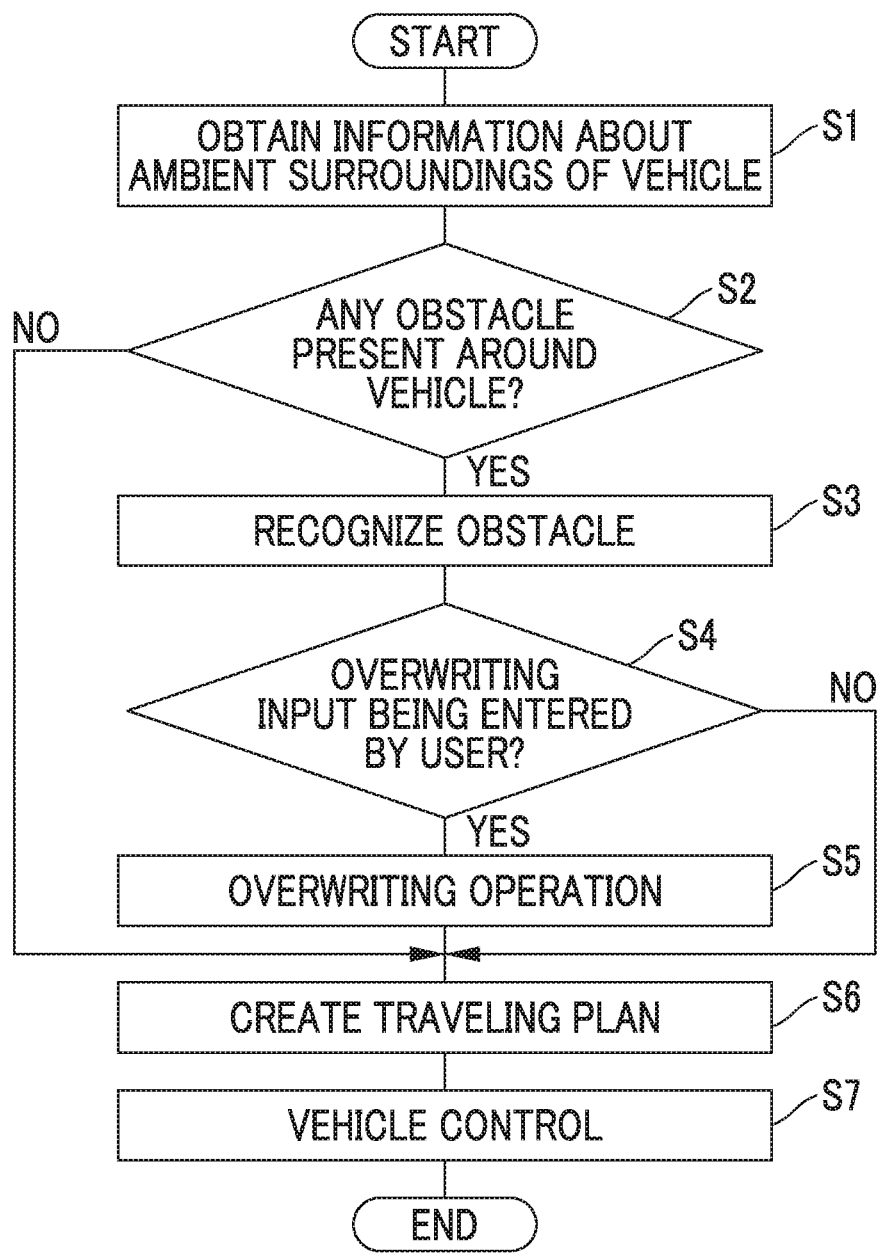
FIG. 2 is a flowchart illustrating one example of a control routine concerning automated driving, which routine is executed by the automated driving system of FIG. 1.

FIG. 2 is a flowchart illustrating one example of control routine concerning automated driving, which routine is executed by the automated driving system 100. In the automated driving system 100, when an automated-driving ON/OFF switch is operated to enter a request for start of automated driving, the following control routine concerning automated driving is performed in the ECU 10. The control routine shown in FIG. 2 may be performed repeatedly, from a time point at which the request for start of automated driving is entered to a time point at which the vehicle V reaches the preset destination (while the automated driving is performed).

Initially, the detection result of the external sensor(s) 3, namely, information concerning ambient surroundings of the vehicle V, is obtained (step S1). The information concerning ambient surroundings of the vehicle V includes at least one of image information captured by the camera, and object information obtained by the radar sensor. Then, it is determined whether any obstacle is present around the vehicle V, based on the detection result of the external sensor(s) 3 (step S2).

If a negative decision (NO) is obtained in step S2, the control proceeds to step S6 that will be described later. If an affirmative decision (YES) is obtained in step S2, the obstacle recognizing unit 11 recognizes the obstacle based on the detection result of the external sensor(s) 3 (step S3). Then, it is determined whether overwriting input is being entered from the user into the input device 9 (step S4).

If an affirmative decision (YES) is obtained in step S4, the overwriting unit 14 executes overwriting operation to exclude the obstacle from the obstacle recognition result obtained by the obstacle recognizing unit 11 (step S5). Namely, in step S5, the obstacle recognition result is overwritten into a result indicating that no obstacle was recognized. After execution of step S5, the overwriting unit 14 stores a log indicating execution of the overwriting operation and the content of the overwriting operation, and generates the obstacle recognition result subjected to the overwriting operation, to the traveling plan creating unit 12. Then, the control proceeds to step S6 that will be described later. On the other hand, if a negative decision (NO) is obtained in step S4, the overwriting unit 14 does not execute overwriting operation, and the obstacle recognition result obtained by the obstacle recognizing unit 11 is generated as it is to the traveling plan creating unit 12. Then, the control proceeds to step S6 that will be described below.

In step S6, the traveling plan creating unit 12 creates a traveling plan, based on at least one of the detection results of the external sensors 3 and the internal sensors 5, position information of the GPS receiver 4, map information of the map database 6, various kinds of information of the navigation system 7, and the obstacle recognition result. Then, the vehicle controller 13 performs vehicle control based on the traveling plan thus created, and causes the vehicle V to autonomously travel according to the traveling plan.

The automated driving system 100 can be applied to various scenes, as will be illustrated below.

For example, in a scene where a person stops and talks in the vicinity of a pedestrians' crossing, if the user can appropriately determine, from the person's movement and expression, that the person will not enter the crossing, the user enters overwriting input into the input device 9, so as to overwrite the obstacle recognition result into a result indicating that there is no person in the vicinity of the crossing. As a result, a traveling plan is created based on the obstacle recognition result subjected to overwriting, and the vehicle V travels autonomously, without being switched to manual driving. Further, if the input into the input device 9 is stopped, the system returns to a condition where the obstacle recognition result is not overwritten. In this case, a traveling plan is created based on the obstacle recognition result that is not subjected to overwriting, and the vehicle V autonomously travels as usual.

In another example, in a scene where the vehicle V waits for turning right at an intersection, or a scene where the vehicle V waits for a lane change, there is a need to predict the behavior of an oncoming vehicle with high accuracy, so as to enable the vehicle V to cross an oncoming lane or enter the oncoming lane at the right time. If the user can appropriately determine that the oncoming vehicle will not interfere with traveling of the vehicle V, the user performs input into the input device 9, so as to overwrite the obstacle recognition result into a result indicating the absence of the oncoming vehicle. As a result, a traveling plan is created based on the obstacle recognition result subjected to overwriting, and the vehicle V can immediately turn right or make a lane change in the automated driving mode, without being brought into a situation where the vehicle V misses the timing, and cannot turn right or make a lane change.

In a further example, it is not easy for the automated driving system 100 to correctly recognize fallen leaves on a road, or weeds that stick out into a road, from outside the road. If the user can appropriately determine that the fallen leaves or weeds do not interfere with traveling of the vehicle V, the user performs input into the input device 9, so as to overwrite the obstacle recognition result into a result indicating the absence of the fallen leaves or weeds. As a result, a traveling plan is created based on the obstacle recognition result subjected to overwriting, and the vehicle V travels autonomously, while stamping on the fallen leaves or weeds in some cases, without stopping traveling autonomously or performing rapid steering.

In the automated driving system 100 as described above, the overwriting unit 14 can overwrite the obstacle recognition result on the system side, via input of the user. Even in the case where it is difficult for the obstacle recognizing unit 11 to correctly recognize an obstacle around the vehicle V, the user can exclude the obstacle from the obstacle recognition result by appropriately performing input operation, so as to continue automated driving (avoid switching to manual driving). Namely, it is possible to curb deterioration of the convenience of automated driving.

In the automated driving system 100, the overwriting unit 14 performs the overwriting operation, only during the period in which input from the user is continued. Thus, the user can designate the period during which the overwriting operation is carried out. Consequently, the vehicle V can be controlled according to the intention of the user.

The input device 9 is not limited to any particular device. When the input device 9 is a switch, it may be a slide switch, a toggle switch, or a lock switch. The input device 9 may be a touch sensor, or a touch panel. The input device 9 may permit voice input via a microphone, or gesture input via a camera.

Second Embodiment

Next, a second embodiment will be described. In the following, only the points in which the second embodiment is different from the first embodiment will be described, and repeated description will not be provided.

Figure 3:
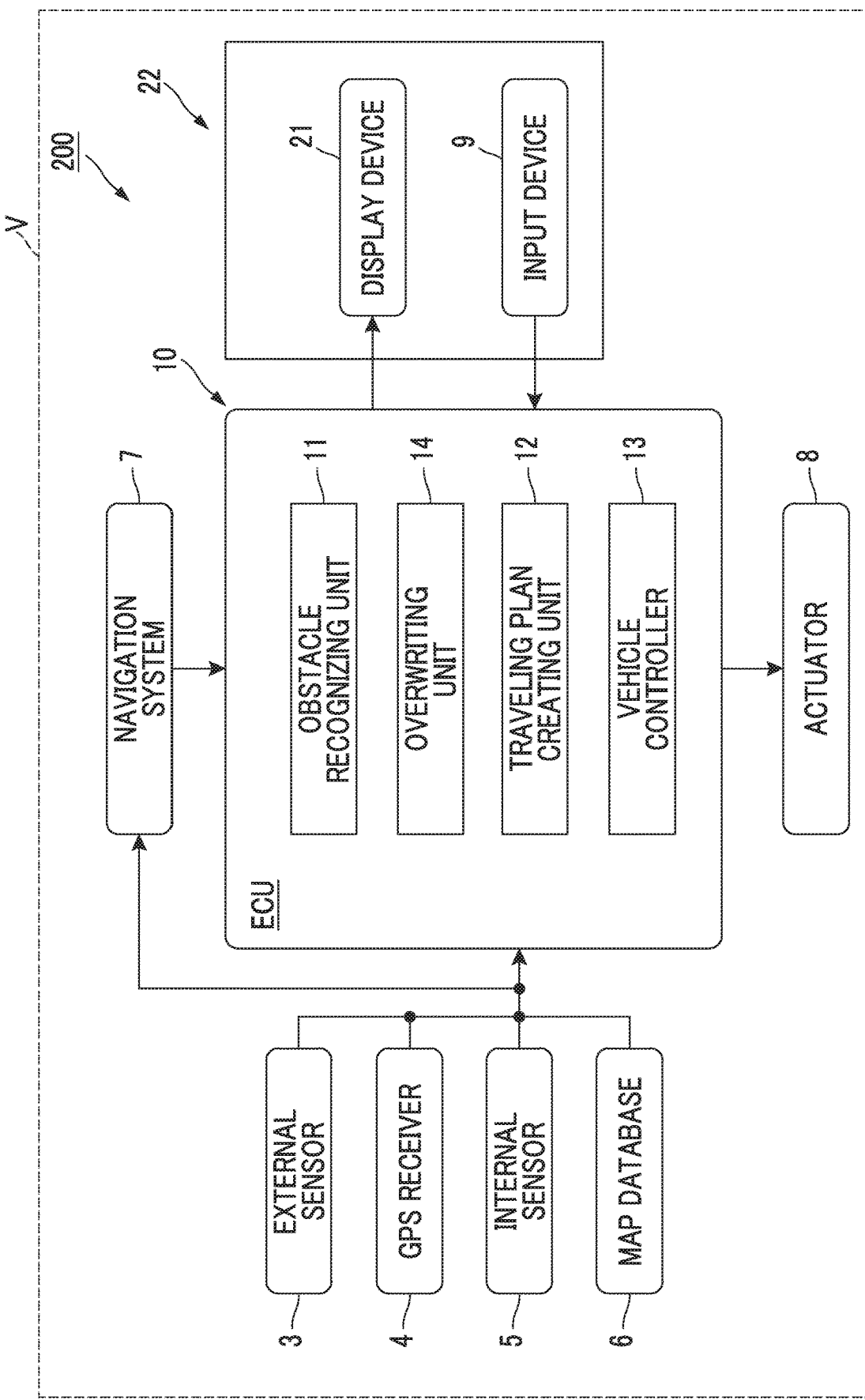
FIG. 3 is a block diagram showing the configuration of an automated driving system of a second embodiment.

FIG. 3 is a block diagram showing the configuration of an automated driving system 200 of the second embodiment. As shown in FIG. 3, the automated driving system 200 further includes a display device 21. The display device 21 is a presenting unit that presents an obstacle recognition result of the obstacle recognizing unit 11 to the user. The display device 21 allows the obstacle recognition result to be shared by the system side and the user. In this embodiment, the display device 21 is also used as the input device 9, and a touch panel 22 is used as the input device 9 and the display device 21.

The overwriting unit 14 of the automated driving system 200 can perform partial overwriting operation as operation to exclude (or ignore) a part of two or more obstacles from the obstacle recognition result, as the overwriting operation. The partial overwriting operation is operation to selectively or partially overwrite the recognized two or more obstacles. For example, in the case where two or more obstacles are recognized by the obstacle recognizing unit 11, and the two or more obstacles are displayed on the display device 21, if the user performs overwriting input (e.g., a touch on the touch panel 22) for excluding one obstacle from the obstacle recognition result via the input device 9, the overwriting unit 14 ignores only the one obstacle, out of the obstacle recognition result.

Figure 4:
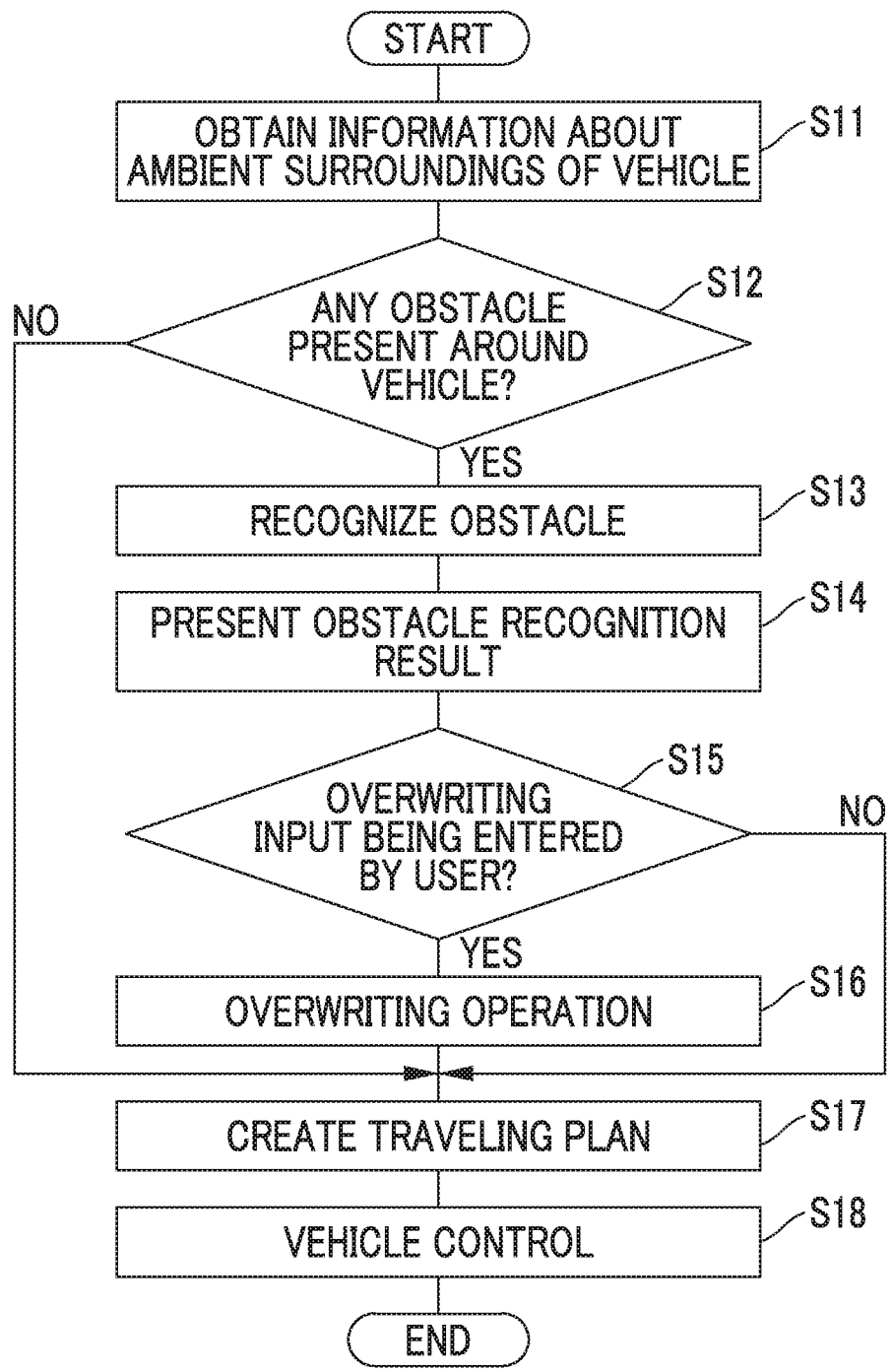
FIG. 4 is a flowchart illustrating one example of a control routine concerning automated driving, which routine is executed by the automated driving system of FIG. 3.

FIG. 4 is a flowchart illustrating one example of a control routine concerning automated driving, which routine is executed by the automated driving system 200. The control routine shown in FIG. 4 may be performed repeatedly, from a time point at which the request for start of automated driving is entered to a time point at which the vehicle V reaches the preset destination (while the automated driving is performed). In the automated driving system 200, the ECU 10 obtains information concerning ambient surroundings of the vehicle V (step S11), as in the above step S1. Then, as in the above step S2, it is determined whether any obstacle is present in the vicinity of the vehicle V (step S12).

If a negative decision (NO) is obtained in step S12, the control proceeds to step S17 that will be described later. If an affirmative decision (YES) is obtained in step S12, the obstacle is recognized by the obstacle recognizing unit 11 (step S13), as in the above step S3. Then, the obstacle recognition result obtained by the obstacle recognizing unit 11 is presented via the display device 21 (step S14). As in the above step S4, it is determined whether the user is entering overwriting input into the input device 9 (step S15).

If an affirmative decision (YES) is obtained in step S15, the overwriting unit 14 executes overwriting operation to exclude the obstacle from the obstacle recognition result obtained by the obstacle recognizing unit 11 (step S16). After execution of step S16, the obstacle recognition result subjected to the overwriting operation is generated to the traveling plan creating unit 12, and the control proceeds to step S17 that will be described later. On the other hand, if a negative decision (NO) is obtained in step S15, the overwriting unit 14 does not perform the overwriting operation, and the obstacle recognition result obtained by the obstacle recognizing unit 11 is generated as it is to the traveling plan creating unit 12. Then, the control proceeds to step S17 that will be described later. In step S17, the traveling plan creating unit 12 creates a traveling plan, as in the above step S6. Then, as in the above step S7, the vehicle controller 13 performs vehicle control based on the traveling plan, so that the vehicle V autonomously travels according to the traveling plan (step S18).

In the automated driving system 200 as described above, too, the above effect is yielded, namely, deterioration of the convenience of automated driving can be curbed.

In the automated driving system 200, in a scene where the vehicle V enters an intersection, for example, if the obstacle recognizing unit 11 recognizes a preceding vehicle and a pedestrian as obstacles, and the user performs overwriting input for excluding the pedestrian on the input device 9 in the form of the touch panel 22, the overwriting unit 14 can perform partial overwriting operation to ignore only the pedestrian (a part), rather than all of the preceding vehicle and the pedestrian, out of the obstacle recognition result. This makes it possible to further avoid rear-end collision at the intersection.

The automated driving system 200 further includes the display device 21 that presents the obstacle recognition result of the obstacle recognizing unit 11 to the user. The display device 21 enables the user to check the obstacle recognition unit. The user can be aware of a difference between his/her recognition of obstacles, and the obstacle recognition result obtained by the automated driving system 200. Thus, it becomes easier for the user to use the system, for execution of the partial overwriting operation.

The display device 21 may include at least one of a display panel for displaying image information to the user, and a speaker for voice output, for example, in place of or in addition to the touch panel 22. The partial overwriting operation can be similarly performed in the above first embodiment, a third embodiment below, and a fourth embodiment below.

Third Embodiment

Next, the third embodiment will be described. In the following, only the points in which the third embodiment is different from the first embodiment will be described, and repeated description will not be provided.

Figure 5:
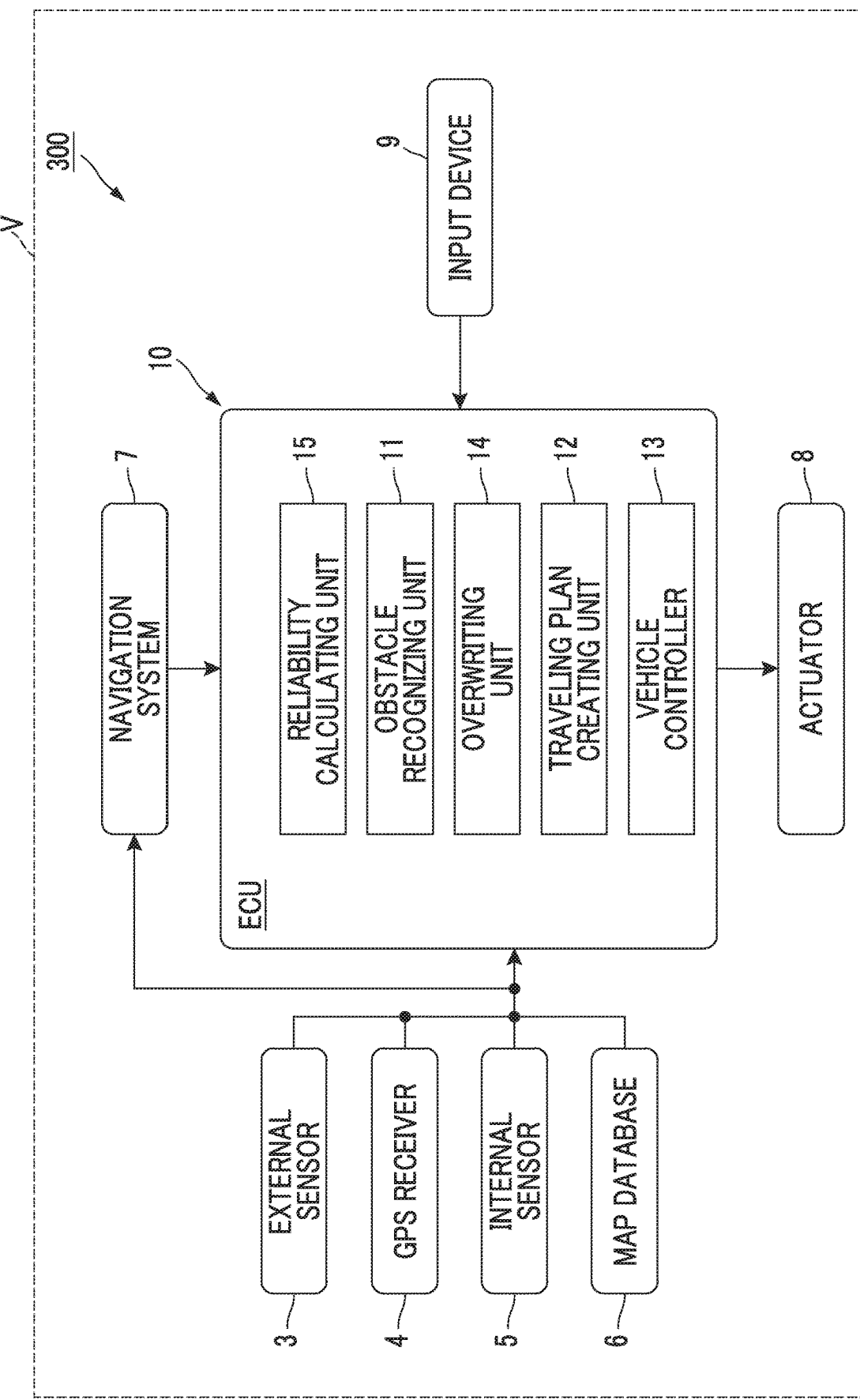
FIG. 5 is a block diagram showing the configuration of an automated driving system of a third embodiment.

FIG. 5 is a block diagram showing the configuration of an automated driving system 300 of the third embodiment. As shown in FIG. 5, the ECU 10 of the automated driving system 300 further includes a reliability calculating unit 15.

The reliability calculating unit 15 calculates the reliability of the obstacle recognition result obtained by the obstacle recognizing unit 11. The reliability is an indicator that indicates the authenticity of the obstacle recognition result, or the degree thereof. The reliability may be expressed by a level, numerical value, high or low, presence or absence, or the like, for example. As the reliability is higher (or when there is reliability), it can be determined that the obstacle recognition result is authentic. The reliability may be calculated based on information on the weather around the vehicle V. For example, the calculated reliability is reduced when the weather around the vehicle V is bad (rain, snow, or fog, for example), and the calculated reliability is increased when the weather around the vehicle V is good (sunny, for example).

Also, the reliability may be calculated using the past overwriting rate. For example, the calculated reliability is reduced when the past overwriting rate is higher than a predetermined rate. The past overwriting rate is obtained by dividing the number of times of execution of the overwriting operation in the past at the current position of the vehicle V, by the number of times the vehicle V passes the current position while traveling in the past.

Also, the reliability may be calculated from the stability and continuity of output concerning the obstacle recognition result. For example, point group data obtained via LIDAR, for example, is acquired in chronological order, and the calculated reliability is increased as the number of changes per unit time in the point group data is smaller. Also, the reliability may be calculated from the number of obstacles included in the obstacle recognition result. For example, the calculated reliability is reduced when the number of obstacles is larger than a predetermined value, for example. The reliability may be calculated for each of various scenes (traveling situations) as described above. The method of calculating the reliability is not limited to any particular one. The reliability may be calculated using various know methods.

The overwriting unit 14 of the automated driving system 300 performs overwriting operation according to input from the user, when the reliability calculated by the reliability calculating unit 15 is smaller than a predetermined threshold value.

Figure 6:
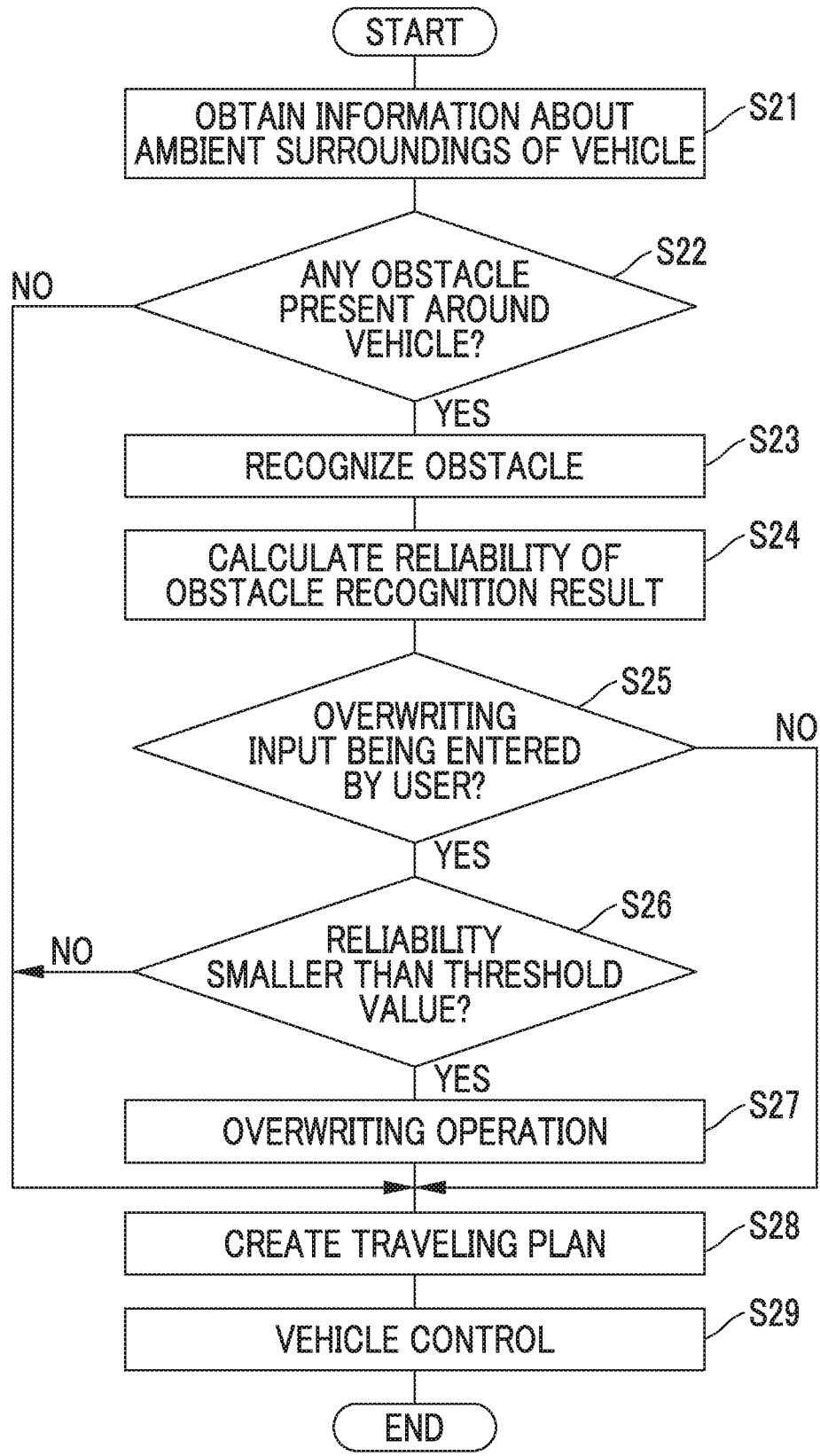
FIG. 6 is a flowchart illustrating one example of a control routine concerning automated driving, which routine is executed by the automated driving system of FIG. 5.

FIG. 6 is a flowchart illustrating one example of a control routine concerning automated driving, which routine is executed by the automated driving system 300. The control routine shown in FIG. 6 may be performed repeatedly, from a time point at which the request for start of automated driving is entered to a time point at which the vehicle V reaches the preset destination (while the automated driving is performed). In the automated driving system 300, the ECU 10 obtains information concerning ambient surroundings of the vehicle V (step S21), as in the above step S1. Then, as in the above step S2, it is determined whether an obstacle is present in the vicinity of the vehicle V (step S22).

If a negative decision (NO) is obtained in step S22, the control proceeds to step S28 that will be described later. If an affirmative decision (YES) is obtained in step S22, the obstacle is recognized by the obstacle recognizing unit 11 (step S23), as in the above step S3. The reliability of the obstacle recognition result obtained by the obstacle recognizing unit 11 is calculated by the reliability calculating unit 15 (step S24), As in the above step S4, it is determined whether the user is entering overwriting input into the input device 9 (step S25).

If an affirmative decision (YES) is obtained in step S25, it is determined whether the calculated reliability is smaller than the threshold value (step S26). If an affirmative decision (YES) is obtained in step S26, the overwriting unit 14 performs overwriting operation (step S27). After execution of step S27, the obstacle recognition result subjected to the overwriting operation is generated to the traveling plan creating unit 12, and the control proceeds to step S28 that will be described later.

On the other hand, if a negative decision (NO) is obtained in step S25, or a negative decision (NO) is obtained in step S26, the overwriting unit 14 does not perform the overwriting operation, and the obstacle recognition result obtained by the obstacle recognizing unit 11 is generated as it is to the traveling plan creating unit 12. Then, the control proceeds to step S28 that will be described later. In step S28, the traveling plan creating unit 12 creates a traveling plan, as in the above step S6. Then, as in the above step S7, the vehicle controller 13 performs vehicle control based on the traveling plan, so that the vehicle V autonomously travels according to the traveling plan (step S29).

In the automated driving system 300 as described above, too, the above effect is yielded, namely, deterioration of the convenience of automated driving can be curbed.

In the automated driving system 300, when the reliability of the obstacle recognition result is equal to or larger than the threshold value, the overwriting operation is not carried out even if overwriting input is performed by the user via the input device 9. If the reliability of the obstacle recognition result is high, the traveling plan can be created by surely taking account of the obstacle recognition result. It is thus possible to avoid execution of overwriting operation due to a mistake in the input of the user, thus achieving a fail-safe system.

Fourth Embodiment

Next, the fourth embodiment will be described. In the following, only the points in which the fourth embodiment is different from the first embodiment will be described, and repeated description will not be provided.

FIG. 7 is a block diagram showing the configuration of an automated driving system 400 of the fourth embodiment. As shown in FIG. 7, the ECU 10 of the automated driving system 400 further includes a blind area recognizing unit 16.

The blind area recognizing unit 16 recognizes a blind area around the vehicle V, based on the detection result of the external sensor(s) 3. The blind area means an area in which it is difficult for the system to recognize an obstacle. The blind area recognizing unit 16 outputs the result of blind area recognition to the traveling plan creating unit 12, via the overwriting unit 14.

The traveling plan creating unit 12 of the automated driving system 400 creates a traveling plan of the vehicle V, further based on the blind area recognition result generated from the blind area recognizing unit 16 via the overwriting unit 14.

In the overwriting operation performed by the overwriting unit 14 of the automated driving system 400, the overwriting unit 14 excludes one blind area or at least a part of two or more blind areas, from the blind area recognition result based on which the traveling plan is created by the traveling plan creating unit 12. More specifically, in the overwriting operation, assuming that no blind area was recognized by the blind area recognizing unit 16, 0 (a result indicating that no blind area is recognized) is generated from the blind area recognizing unit 16 to the traveling plan creating unit 12.

In the automated driving system 400 as described above, too, the above effect is yielded, namely, deterioration of the convenience of automated driving can be curbed.

For example, it may be easy for a human driver to detect an obstacle, using a curve mirror installed at a blind intersection, or the like, but it may be difficult for the system to recognize the obstacle. In the automated driving system 400, when the user can determine that there is no obstacle in a blind area, the user performs input into the input device 9, so that the blind area recognition result is overwritten, and information on the blind area is ignored. As a result, the vehicle V is permitted to smoothly proceed into the intersection.

In the automated driving system 400 as described above, the overwriting unit 14 may not include the function of performing overwriting operation to exclude one obstacle or at least a part of two or more obstacles from the obstacle recognition result.

Also, in the automated driving system described in the above embodiments, the short-term traveling plan may be created repeatedly while the automated driving is performed. In this case, a next traveling plan is created while the vehicle V is traveling based on a traveling plan.

The illustrated embodiments may be carried out in various forms, with various changes or improvements based on the knowledge of those skilled in the art. In the illustrated embodiments, a part of the functions of the ECU 10 may be implemented by a computer of a facility, such as an information processing sensor, which is able to communicate with the vehicle V.

What is claimed is:

1. An automated driving system comprising
at least one electronic control unit configured to:
  recognize at least one obstacle around a vehicle, based on ambient surroundings of the vehicle;
  create a traveling plan of the vehicle, based on the ambient surroundings and a result of recognition of the at least one obstacle;
  control the vehicle using an actuator installed on the vehicle, based on the traveling plan; and
  perform, according to input from a user of the vehicle, an overwriting operation to change the result of recognition of the at least one obstacle used for creation of the traveling plan,
wherein
the at least one electronic control unit is configured to:
  perform an operation to exclude at least a part of the at least one obstacle from the result of recognition of the at least one obstacle, as the overwriting operation during an automated driving mode, and
  switch from the automated driving mode in which the vehicle is controlled based on the traveling plan to a manual driving mode in which the vehicle is controlled based on an operation of the user, based on the result of recognition of the at least one obstacle.

2. The automated driving system according to claim 1, further comprising
a display configured to present the result of recognition of the at least one obstacle, to the user.

3. The automated driving system according to claim 2, wherein:
the at least one electronic control unit is configured to perform the overwriting operation, according to the input from the user to the display.

4. The automated driving system according to claim 1, wherein
the at least one electronic control unit is configured to perform the overwriting operation, only during a period in which the input from the user is continued.

5. The automated driving system according to claim 1, wherein:
the at least one electronic control unit is configured to
  calculate a reliability of the result of recognition of the at least one obstacle; and
  perform the overwriting operation according to the input from the user, when the calculated reliability is smaller than a predetermined threshold value.

6. The automated driving system according to claim 1, wherein
the at least one electronic control unit is configured to
create a short-term traveling plan, while the vehicle is controlled based on the traveling plan and
perform the overwriting operation on the result of recognition of the at least one obstacle used for creation of the short-term traveling plan while the vehicle is controlled based on the traveling plan.

7. An automated driving system comprising
at least one electronic control unit configured to:
  recognize ambient surroundings of a vehicle and at least one obstacle around the vehicle;
  create a traveling plan of the vehicle, based on a result of recognition of the ambient surroundings and a result of recognition of the at least one obstacle;
  control the vehicle using an actuator installed on the vehicle, based on the traveling plan;
  recognize a blind area included in the ambient surroundings, around the vehicle, the blind area being an area in which it is difficult to recognize the at least one obstacle; and
  perform an overwriting operation to exclude at least a part of the blind area from the result of recognition of the ambient surroundings, according to an input from a user, wherein the overwriting operation is performed during an automated driving mode,
wherein
the at least one electronic control unit is configured to switch from the automated driving mode in which the vehicle is controlled based on the traveling plan to a manual driving mode in which the vehicle is controlled based on an operation of the user, based on the result of recognition of the at least one obstacle.

8. The automated driving system according to claim 7, wherein
the overwriting operation performed by the at least one electronic control unit further includes an operation to exclude at least a part of the at least one obstacle from the result of recognition of the at least one obstacle.

* * * * *